Dec. 27, 1955  M. GREEN  2,728,141
FOOT PLATE OR BASE FOR CLOTH CUTTING MACHINE
Filed May 4, 1953  2 Sheets—Sheet 1

INVENTOR.
Martin Green,
BY George D. Richards
Attorney

Dec. 27, 1955   M. GREEN   2,728,141
FOOT PLATE OR BASE FOR CLOTH CUTTING MACHINE
Filed May 4, 1953   2 Sheets-Sheet 2

INVENTOR.
Martin Green,
BY George L. Richards
Attorney

United States Patent Office 2,728,141
Patented Dec. 27, 1955

2,728,141

FOOT PLATE OR BASE FOR CLOTH CUTTING MACHINE

Martin Green, Mahwah, N. J.

Application May 4, 1953, Serial No. 352,838

9 Claims. (Cl. 30—273)

This invention relates to improvements in cloth cutting machines of the vertically reciprocated cutting blade type; and the invention has reference, more particularly, to an improved construction of foot plate or base by which the cutting mechanism of a cloth cutting machine and operating means therefor is supported, subject to propulsion over a cutting table and relative to cloth to be cut under the manual control of the machine operator.

When using a cloth cutting machine to cut through cloth or other sheet material, as the machine is moved over the surface of a cutting table relative to the material to be cut which is supported thereon, the foot plate or base of the machine passes beneath the supported material, so that the material rides over the top surface of the foot plate or base. When multiple layers of piled material are being cut, the weight of the material, as it bears upon the top surface of the foot plate or base, induces considerable frictional resistance to forward movement of the machine, and also increases frictional resistance to the movement of the machine relative to the supporting cutting table. Such frictional resistance, by its impedance of machine movement, greatly increases the labor of the operator of the machine.

Having the above in view, this invention has for an object to provide, in a cloth cutting machine, a novel construction of foot plate or base which can be moved relative to the cutting table and to the material to be cut with a minimum of frictional resistance with respect to both the cutting table and the material to be cut.

Another object of this invention is to provide the foot plate or base of the cloth cutting machine, behind the reciprocating blade and standard of the machine, with means which supports the material being cut so as to reduce frictional contact thereof with the foot plate or base, said means being optionally adjustable to additionally lift divided marginal portions of the material, as severed by the cutting blade, so that the cut edges of the material are spread relative to the blade guiding standard of the machine, whereby to avoid undue frictional contact of said cut edges with the latter, and thus to further prevent frictional impedance of forward movement of the cutting machine as propelled by the operator.

A further object of the invention is to optionally provide the foot plate or base of the machine with a pivotally mounted rearward traction roller which will swing to right or left as the machine is propelled in a curved path of movement which may be necessary to cut the material in conformance to curvilinear requirements of material shapes or patterns desired to be produced, and thus further diminishing resistance to forward movement of the machine.

The above and other objects of this invention will be understood from a reading of the following description of the invention in connection with the accompanying drawings, in which.

Similar characters of reference are employed in the hereinabove described views, to indicate corresponding parts.

Figure 1:
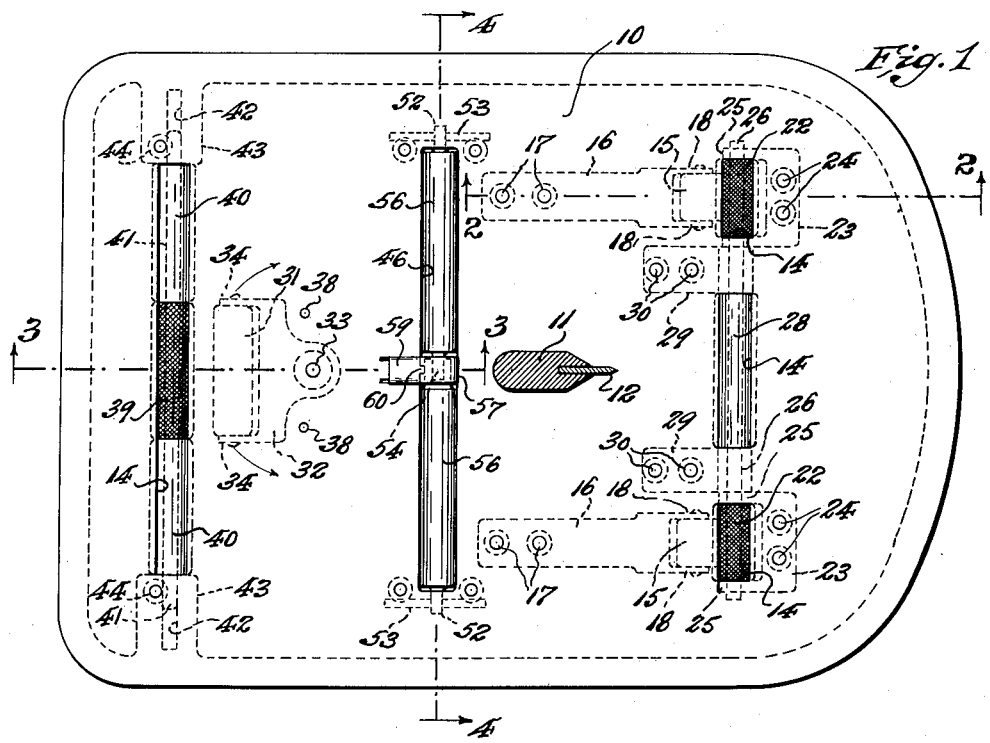
Fig. 1 is a top plan view of a foot plate or base for a cloth cutting machine made according to this invention, the standard and cutting blade of the machine being shown in section.
Figure 2:
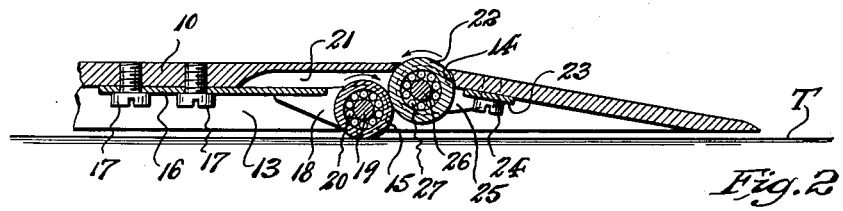
Fig. 2 is a fragmentary longitudinal section, taken on line 2—2 in Fig. 1, but drawn on an enlarged scale.
Figure 3:
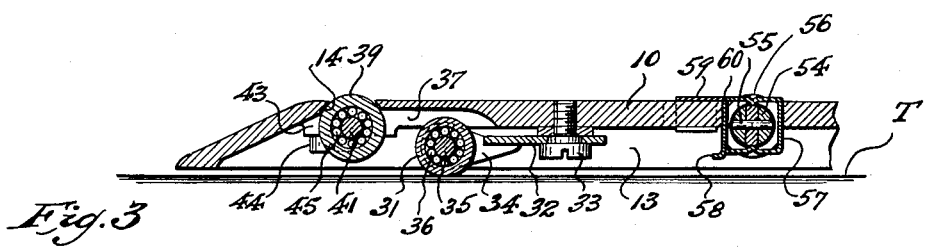
Fig. 3 is another fragmentary longitudinal section, taken on line 3—3 in Fig. 1, but also drawn on an enlarged scale.

Referring to the drawings, the reference character 10 indicates the foot plate or base of a cloth cutting machine, the same being provided with traction rollers, disposed and arranged as hereinafter set forth, to facilitate its movement over a supporting surface, such as a cutting table top T, and beneath a lay of cloth or other sheet material (not shown), when cutting the latter. Upstanding from said foot plate or base 10 is a standard 11 by which a vertically reciprocable cutting blade 12 is guided, and by which blade operating mechanism (not shown) is supported.

The foot plate or base 10 is of downwardly open hollow formation to provide therein an underside chamber 13 within which are mounted suitably disposed traction rollers and material supporting rollers; the latter being so arranged that their peripheries project through openings 14 in the body of the foot plate or base 10, so as to project somewhat above the top surface of the latter over which the material moves during the operation of the cutting machine.

The traction rollers include a pair of transversely aligned, laterally spaced apart forward traction rollers 15 which are mounted in connection with the front or toe end portion of the foot plate or base 10, forwardly of the standard 11 and cutting blade 12. Each forward traction roller 15 is supported by a forwardly extending carrier bracket 16, which is secured to the underside of the foot plate or base 10, within the chamber 13, by fastening screws 17, or other suitable fastening means. Said carrier bracket is provided at its free forward end with laterally spaced bearing ears 18, to and between which extends the shaft 19 upon which the forward traction roller 15 is rotatably mounted. Each traction roller 15 preferably includes antifriction bearing means 20 which is cooperative with the supporting shaft 19. Above each forward traction roller 15, the underside of the foot plate or base 10 is cut away to provide a clearance chamber 21 to accommodate said traction roller.

The material supporting rollers include a pair of transversely aligned, laterally spaced apart forward material supporting rollers 22, which are also mounted in connection with the front or toe end portion of the foot plate or base 10 respectively in front of the respective forward traction rollers 15, and in such relation thereto that the periphery of a traction roller 15 frictionally engages the periphery of an opposed material supporting roller 22, for purposes hereinafter more fully explained. To better assure such frictional engagement of these traction and material supporting rollers, the peripheral surfaces of the latter are preferably somewhat roughened by fine knurling as shown. Each said forward material supporting roller is carried by a carrier bracket 23, which is secured to the underside of the foot plate or base 10, within the chamber 13, by fastening screws 24, or other suitable fastening means. Each carrier bracket 23 is provided with laterally spaced bearing ears 25 to support a shaft 26 upon which the material supporting rollers 22 are mounted. Each material supporting roller 22 preferably includes antifriction bearing means 27 for cooperation with the shaft 26. The disposition of the material supporting rollers 22 is such that the top peripheries thereof project through an opening 14 of the foot plate or base 10, so as to intersect the plane of the top surface of the latter, and thus to be exposed to contact with the material to be cut, as said material moves over said top surface during operation of the cutting machine.

It is desirable to provide an idler material supporting roller 28 aligned with and intermediate the forward material supporting rollers 22, and also so arranged that its top periphery projects through an opening 14 of the foot plate or base 10, whereby, together with said supporting rollers 22, to engage and support the material moving over the top surface of the foot plate or base during operation of the cutting machine. Preferably, the shaft 26 is common to both the forward material rollers 22 and said idler material supporting roller 28, and this shaft is further supported, intermediate the respective forward material supporting rollers 22 and said idler supporting roller 28, by bearing brackets 29, which are affixed to the underside of the top plate or base 10 by fastening screws 30, or other suitable fastening means.

The traction rollers further include a central rearward traction roller 31 which is mounted in connection with the rear or heel end portion of the foot plate or base 10, and thus rearwardly of the standard 11 and cutting blade 12 of the machine. Said rearward traction roller 31 is supported, within the chamber 13 of the foot plate or base, by a carrier bracket 32 which is pivotally mounted to swing, left or right, in horizontal plane relative to the central longitudinal axis of the foot plate or base, and, to this end, is supported by a suitable pivoting means, such as a shouldered pivoting screw 33 which is threaded into the body of the foot plate or base. Said pivoted carrier bracket 32 is provided at its free rearward end with laterally spaced bearing ears 34, to and between which extends a shaft 35 upon which said rearward traction roller 31 is rotatably mounted. Said rearward traction roller 31 preferably includes antifriction bearing means 36 which is cooperative with the supporting shaft 35. Above said rearward traction roller 31, the underside of the foot plate or base body is cut away to provide a clearance chamber 37 to accommodate said traction roller. Stop pins 38 affixed to the foot plate or base, within the chamber 13 thereof, and respectively suitably spaced relative to opposite sides of the pivoted carrier bracket 32, serve to limit swinging movements of the latter and the traction roller 31 carried thereby.

The material supporting rollers also include a central rearward material supporting roller 39, which is mounted in connection with the rear or heel end portion of the foot plate or base 10 behind the central rearward traction roller 31. In addition to said central rearward material supporting roller 39, it is preferred to also provide idler material supporting rollers 40, which are aligned with said central rearward material supporting roller 39, respectively adjacent opposite ends of the latter. A shaft 41, common to said rearward material supporting rollers 39 and 40, serves to rotatably support said rollers in such disposition that the top peripheries thereof project through an opening 14 of the foot plate or base 10, whereby to intersect the top surface of the latter, thus being operative to engage and support the material moving over said top surface during operation of the cutting machine. The ends of said shaft 41 are supported in recesses 42 of suitable bearing portions 43 with which the foot plate or base 10 is provided at opposite side marginal portions thereof; said shaft being detachably retained in the recesses of said bearing portions 43 by keepers screws 44. At least the central rearward material supporting roller 39 includes antifriction bearing means 45 for cooperation with the shaft 41.

If desired, said central rearward material supporting roller 39 may be disposed in such rearwardly spaced relation to the central rearward traction roller 31 that, when the latter swings to either left or right, the periphery of an end thereof can engage the periphery of the central rearward material supporting roller 39 for purposes hereinafter explained.

Behind and closely adjacent to the standard 11, the foot plate or base 10 is provided with means to support the material moving over said foot plate or base so as to reduce frictional contact thereof with the latter, which means can also be disposed whereby to lift and spread apart the divided marginal portions of the material, when severed by the cutting blade, thus to prevent undue frictional contact of the cut edges of said material with the standard 11. The means for such purposes is housed within the underside chamber 13 of the foot plate or base 10, and is operative through a transverse opening 46 with which said foot plate or base is provided. Said means comprises a pair of axially expandible and contractible telescopic mandrels, which are respectively pivotally anchored by their outer ends in connection with the body of the foot plate or base 10, with their inner ends pivotally interconnected in alignment with the central longitudinal axis of the foot plate or base, upon which mandrels are rotatably supported respective roller sleeves. By this arrangement, the inner ends of the roller sleeves may be elevated, so that said roller sleeves respectively incline downwardly and outwardly in opposite directions, whereby, when so disposed, to lift and spread apart the divided marginal portions of the severed material for the above stated purposes.

Figure 4:
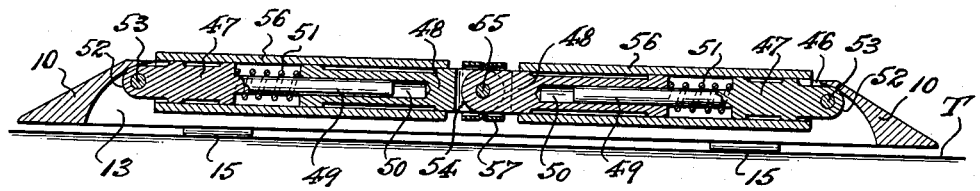
Fig. 4 is a transverse vertical section, taken on line 4—4 in Fig. 1, with the antifriction material supporting rollers in a lowered position.
Figure 5:
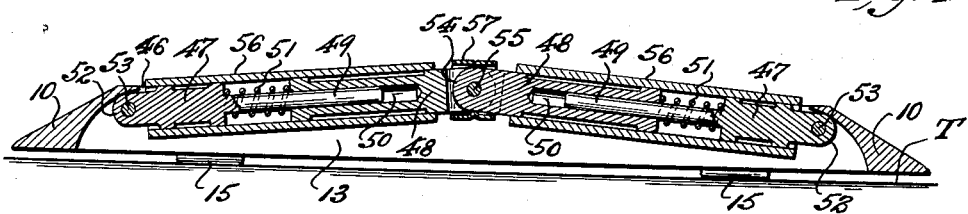
Fig. 5 is a similar view showing said rollers raised to material lifting and spreading position.

Referring more particularly to Figs. 1, 4 and 5, each mandrel comprises an outer mandrel member 47 and a cooperative inner mandrel member 48 axially aligned therewith. One of said mandrel members is provided with a tongue 49 of reduced diameter, which extends axially from its inner end, so as to slidably engage in an axial slideway 50 with which the cooperative opposed mandrel member is provided. Mounted around said tongue 49, between the opposed inner ends of the mandrel members 47 and 48, is a compression spring 51 operative to yieldably expand the mandrel longitudinally. The outer mandrel member 47 is provided with an anchoring hinge ear 52 that pivotally engages a hinge pin 53 which is suitably affixed to the foot plate or base 10. The pair of mandrels, each constructed as above described, are pivotally interconnected at their meeting ends, and, to this end, the opposed ends of their inner mandrel members 48 are provided with cooperative hinge knuckles 54 which are pivotally joined by a hinge pin 55. Mounted on each mandrel, so as to be rotatably supported thereby, is a roller sleeve 56. The pivotally joined meeting ends of the mandrels are enveloped by an endwise open housing member 57 which is vertically movable through the opening 46 with which the foot plate or base 10 is provided. This housing member 57 is provided at its bottom end with a projecting stop tongue 58 that, upon elevation of the joined inner ends of the mandrels, is carried into engagement with the under surface of the foot plate or base 10, thus limiting the extent of elevation of said joined inner ends of the mandrels. When the material lifting and spreading effect of the mandrels and their roller sleeves is not desired to be availed of, these parts can be depressed so that the roller sleeves lie parallel to the top surface of the foot plate or base 10, with the peripheries of the roller sleeves intersecting said surface so as to support the material traversing the latter with friction avoiding effect (see Fig. 4). Means is provided to hold down the mandrels and their roller sleeves in such lowered position, this means comprising a slide bolt element 59 suitably supported in connection with the foot plate or base 10 for movement toward and from the housing member 57. Said slide bolt element 59 and housing member 57 are provided with cooperative bolt tongue and socket means 60 which, when engaged, prevent upward displacement of the housing member from a lowered position thereof (see Fig. 1).

When it is desired to raise the roller sleeves 56 to their inclined material lifting and spreading positions, the slide bolt element 59 is withdrawn to release the housing member 57 for upward movement. When the housing member is thus released, the compression springs 51 of the mandrels exert longitudinally expanding effect thereupon, thus causing the inner end portions of the same to swing upward to the lifted position shown in Fig. 5. The extent of such elevation is limited by the engagement of the stop tongue 58 of the housing member 57 with the under surface of the foot plate or base 10.

In the use of the cloth cutting machine having the improved foot plate or base of this invention, when the machine is advanced through the material to be cut, said material will ride up onto and will traverse the top surface of said foot plate or base so as to be first engaged by the forward material supporting rollers 22 and the idler roller 28. Due to the fact that the peripheries of the forward traction rollers 15 frictionally engage the peripheries of the forward material supporting rollers 22, the latter will be positively driven by the former in counterclockwise direction, whereby not only to fend the material from frictional contact with the top surface of the foot plate or base 10, but also to aid in imparting rearward movement of the material toward the cutting blade 12 with minimum resistance, and therefore greatly easing the labor of the operator in driving the machine through the cloth to be cut. If the roller sleeves 56 are raised to material lifting and cut edge separating disposition, the resistance of advance of the machine relative to the material undergoing the cutting operation is further reduced. Owing to the ability of the rearward traction roller 31 to swing to right or left about its pivotal connection with the foot plate or base 10, when the machine is advanced in a curvilinear path, as may be required by the pattern to which the material is to be cut, said rearward traction roller will swing conformably to the swerving advance of the machine, thus further reducing resistance to advancing movement of the machine. Furthermore, if the curved path of such movement is pronounced, the rearward traction roller 31 can engage and drive the rearward material supporting roller 39, whereby to assist the traversing movement of the material over the foot plate or base 10, and thereby further decrease resistance to machine advance, and thus further reduce the labor of the machine operator. If the material lifting and spreading effect of the roller sleeves 56 is not required, the same can be lowered to a plane parallel to the top surface of the foot plate or base 10, in which position the same will serve merely to reduce friction of the traversing movement of the material relative to the top surface of the foot plate or base.

Figure 6:
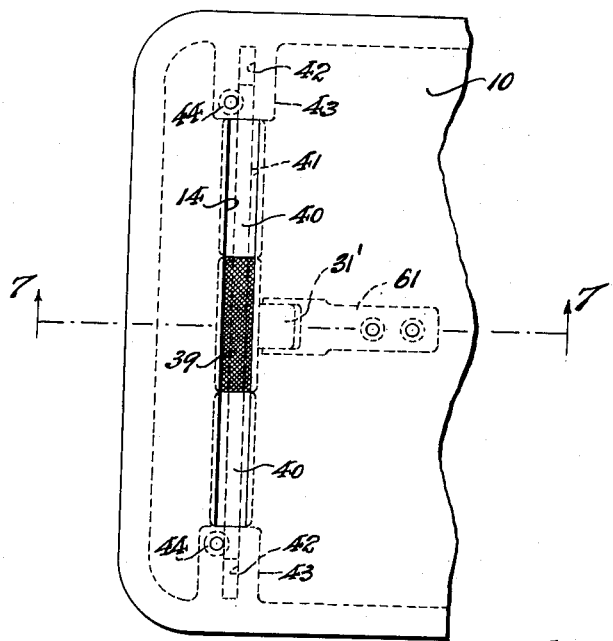
Fig. 6 is a fragmentary top plan view of the rearward portion of the foot plate or base showing a modified arrangement of rearward traction roller in cooperative driving relation to an antifriction material supporting roller.
Figure 7:
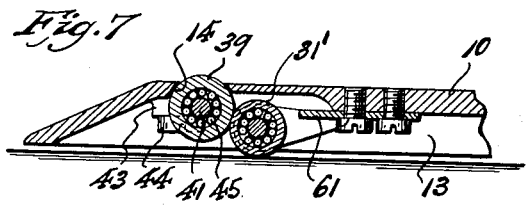
Fig. 7 is a fragmentary longitudinal section, taken on line 7—7 in Fig. 6, but drawn on an enlarged scale.

Although in a preferred embodiment of this invention it is desired to provide the rearward traction roller in the laterally swingable arrangement thereof above described, there are cases where such arrangement may not be desired, but rather that said rearward traction roller be mounted in fixed relation to the foot plate or base 10, and in driving relation to a rearward material supporting roller. The latter arrangement is shown in Figs. 6 and 7, wherein a rearward traction roller 31' is supported by a fixed carrier bracket 61, similar to the carrier brackets 16 of the forward traction rollers 15, and in such relation to the rearward material supporting roller 39 that the periphery of said traction roller 31' frictionally engages the periphery of said material supporting roller 39, whereby the latter is driven by the former.

Having now described my invention, I claim:

1. In a cloth cutting machine, the combination with the machine foot plate of a plurality of traction rollers, a plurality of material supporting rollers also mounted in connection with the foot plate, said foot plate having openings through which the top peripheries of said material supporting rollers project whereby to intersect the top surface of said foot plate, and the peripheries of certain of said material supporting rollers being directly frictionally engaged by peripheries of traction rollers whereby rotary motion of said traction rollers is transmitted to the material supporting rollers engaged thereby.

2. In a cloth cutting machine, the combination with the machine foot plate of forward traction roller means mounted on the foot plate adjacent its toe end portion, rearward traction roller means mounted on the foot plate adjacent its heel end portion, forward and rearward material supporting roller means also mounted on the foot plate respectively adjacent its toe and heel end portions, said foot plate having openings through which the top peripheries of said material supporting roller means project whereby to intersect the top surface of the foot plate, and the peripheries of said forward and rearward material supporting roller means being respectively directly frictionally engaged by peripheries of respective forward and rearward traction rollers means whereby rotary motion of the traction roller means is transmitted to the material supporting roller means.

3. In a cloth cutting machine, the combination with the machine foot plate of a pair of laterally spaced apart, transversely disposed, forward traction rollers mounted thereon, a centrally located rearward traction roller, means to pivotally mount said rearward traction roller on the foot plate subject to lateral swinging movement, forward and rearward material supporting rollers also mounted on the foot plate, said foot plate having openings through which the top peripheries of said material supporting rollers project whereby to intersect the top surface of the foot plate, and the peripheries of the forward material supporting rollers being directly frictionally engaged by peripheries of the forward traction rollers whereby rotary motion of said forward traction rollers is transmitted to said forward material supporting rollers.

4. A cloth cutting machine foot plate having intermediate its toe and heel end portions a standard to support a vertically reciprocable cutting blade and means for actuating the latter, means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, and each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate.

5. A cloth cutting machine foot plate having intermediate its toe and heel end portions a standard to support a vertically reciprocable cutting blade and means for actuating the latter, means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate, said roller sleeves, by contraction of their mandrels, being adapted to be disposed in a plane parallel to the top plane of the foot plate, and manipulatable means to releasably hold down said roller sleeves in the latter disposition.

6. A cloth cutting machine foot plate having intermediate its toe and heel end portions a standard to support a vertically reciprocable cutting blade and means for actuating the latter, means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate, a housing member to embrace the pivotally coupled inner ends of said mandrels, stop means carried by said housing member and cooperative with the foot plate whereby to limit uplift movement of said mandrels and roller sleeves, and manipulatable means mounted on the foot plate and cooperative with said housing member to hold the latter in a lowered position whereby to dispose said roller sleeves and mandrels in a plane parallel to the top plane of the foot plate.

7. A cloth cutting machine foot plate having intermediate its toe and heel end portions a standard to support a vertically reciprocable cutting blade and means for actuating the latter, a plurality of traction rollers mounted in connection with the foot plate, a plurality of material supporting rollers also mounted in connection with the foot plate, said foot plate having openings through which the top peripheries of said material supporting rollers project whereby to intersect the top surface of said foot plate, the peripheries of certain of said material supporting rollers being directly frictionally engaged by peripheries of traction rollers whereby rotary motion of said traction rollers is transmitted to the material supporting rollers engaged thereby, and means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, and each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate.

8. A cloth cutting machine foot plate having intermediate its toe and heel end portions a standard to support a vertically reciprocable cutting blade and means for actuating the latter, a plurality of traction rollers mounted in connection with the foot plate, a plurality of material supporting rollers also mounted in connection with the foot plate, said foot plate having openings through which the top peripheries of said material supporting rollers project whereby to intersect the top surface of said foot plate, the peripheries of certain of said material supporting rollers being directly frictionally engaged by peripheries of traction rollers whereby rotary motion of said traction rollers is transmitted to the material supporting rollers engaged thereby, and means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate, said roller sleeves, by contraction of their mandrels, being adapted to be disposed in a plane parallel to the top plane of the foot plate, and manipulatable means to releasably hold down said roller sleeves in the latter disposition.

9. A cloth cutting machine foot plate having intermediate its toe and heel end portions a standard to support a vertical reciprocable cutting blade and means for actuating the latter, a plurality of traction rollers mounted in connection with the foot plate, a plurality of material supporting rollers also mounted in connection with the foot plate, said foot plate having openings through which the top peripheries of said material supporting rollers project whereby to intersect the top surface of said foot plate, the peripheries of certain of said material supporting rollers being directly frictionally engaged by peripheries of traction rollers whereby rotary motion of said traction rollers is transmitted to the material supporting rollers engaged thereby, and means carried by said foot plate rearwardly adjacent to the standard adapted, in one operative position thereof, to lift and spread apart divided marginal portions of material severed by the cutting blade, said latter means comprising a pair of transversely disposed, axially expandible and contractible telescopic mandrels, a roller sleeve rotatably supported by each mandrel, means to pivotally couple together the opposed inner ends of said mandrels in alignment with said standard, means to pivotally anchor the outer ends of said mandrels respectively to opposite side portions of the foot plate, said foot plate having a transverse opening through which top peripheries of the roller sleeves project above the top surface of the foot plate, each mandrel having compression spring means to yieldably expand the same axially, whereby, when expanded, to uplift the inner ends of the roller sleeves and thereby dispose said roller sleeves in oppositely extending, outwardly and downwardly inclined relation to the top plane of the foot plate, a housing member to embrace the pivotally coupled inner ends of said mandrels, stop means carried by said housing member and cooperative with the foot plate whereby to limit uplift movement of said mandrels and roller sleeves, and manipulatable means mounted on the foot plate and cooperative with said housing member to hold the latter in a lowered position whereby to dispose said roller sleeves and mandrels in a plane parallel to the top plane of the foot plate.

References Cited in the file of this patent

UNITED STATES PATENTS

| | | |
|---|---|---|
| 324,404 | Monday | Aug. 18, 1885 |
| 1,271,279 | Clark | July 2, 1918 |
| 1,378,163 | Zawistowski | May 17, 1921 |
| 1,914,528 | Reid | June 20, 1933 |